H. H. SCHRAMM.
RESILIENT VEHICLE WHEEL.
APPLICATION FILED SEPT. 27, 1918.

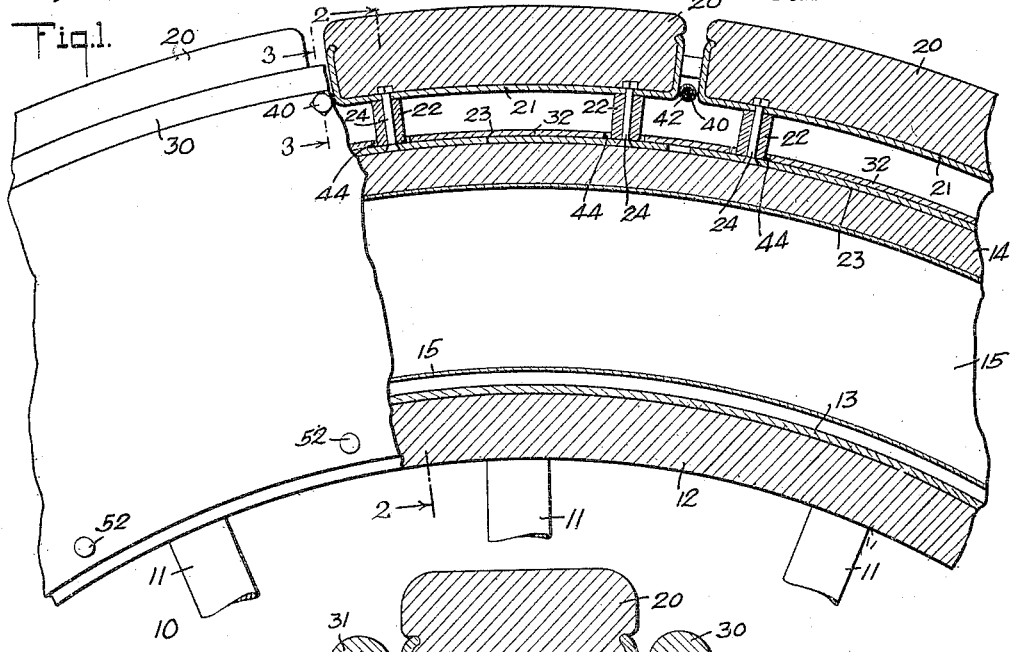

1,319,726.

Patented Oct. 28, 1919.
2 SHEETS—SHEET 2.

WITNESSES
Frederick Diehl.
Redj. Hoster

INVENTOR
H.H.Schramm.
BY
ATTORNEYS

UNITED STATES PATENT OFFICE.

HUGH H. SCHRAMM, OF NEW YORK, N. Y.

RESILIENT VEHICLE-WHEEL.

1,319,726.  Specification of Letters Patent.  Patented Oct. 28, 1919.

Application filed September 27, 1918. Serial No. 255,893.

*To all whom it may concern:*

Be it known that I, HUGH H. SCHRAMM, a citizen of the United States, and a resident of the city of New York, borough of Manhattan, in the county and State of New York, have invented a new and Improved Resilient Vehicle-Wheel, of which the following is a full, clear, and exact description.

The invention relates to vehicle wheels provided with a cushion between the felly and the tread, and its object is to provide a new and improved resilient vehicle wheel more especially designed for use on automobiles, auto-trucks and other similar vehicles and arranged to give the desired resiliency to the wheel without danger of puncturing or otherwise injuring the cushion interposed between the felly and the tread. Another object is to permit of using the wheel in case the cushion is rendered inactive for any reason whatever. Another object is to provide a construction which is simple and readily applicable to wheels of the shoe and inner tube type now generally used.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of a portion of the improved resilient vehicle wheel with parts shown in section;

Fig. 2 is an enlarged transverse section of the same on the line 2—2 of Fig. 1;

Fig. 3 is a similar view of a portion of the same on the line 3—3 of Fig. 1;

Figure 4:
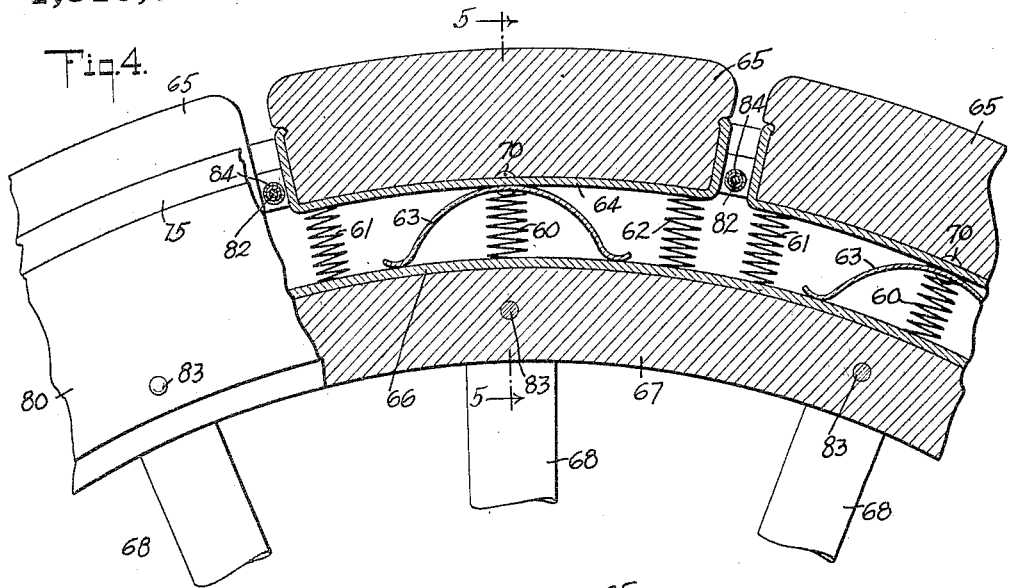
Fig. 4 is a side elevation partly in section of the improved resilient wheel having a cushion of modified form.
Figure 5:
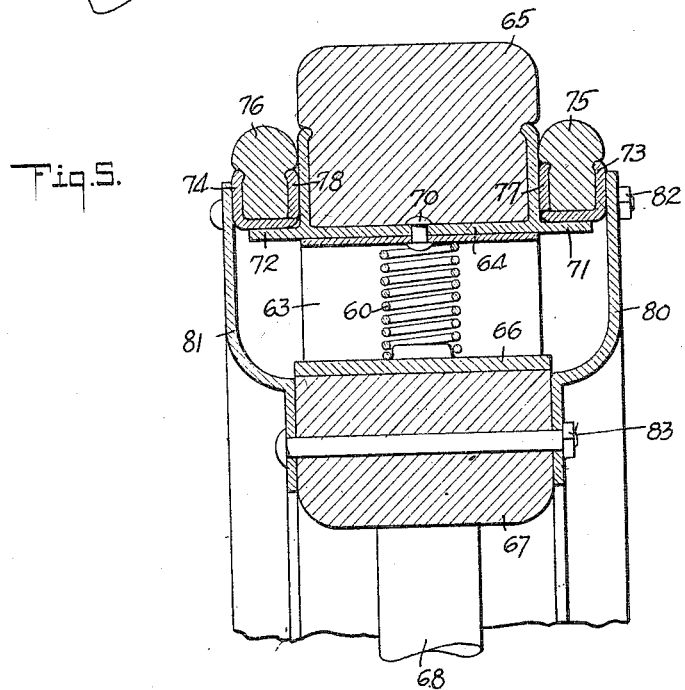
Fig. 5 is an enlarged transverse section of the same on the line 5—5 of Fig. 4.

The resilient vehicle wheel illustrated in Figs. 1 and 2 is provided with a wheel center including the usual hub (not shown), spokes 11 and felly 12, of which the latter supports the usual tire to hold the rim 13 carrying a shoe 14 inclosing an inner tube 15 thus providing a cushion for the wheel. The main tread of the resilient vehicle wheel is made in sections 20 of rubber or other suitable resilient material and each mounted in a cup-shaped holder 21 provided at its bottom with lugs 22 connected with a segmental plate 23 by the use of bolts 24, the said plate 23 of each main tread section 20 resting on the peripheral face of the shoe 14. The plate 23 is slightly arched in cross section to gradually conform to the peripheral face of the shoe 14 when the load is applied and the main tread moves in the plane of the wheel. It will be noticed that by the arrangement described, the shoe 14 and its inner tube 15 are interposed between the wheel center and the main tread to give the desired resiliency to the wheel.

An auxiliary tread formed of two ring-shaped members 30 and 31 of rubber serve to take up the load in case the load is increased beyond the sustaining power of the cushion or the latter becomes defective for any reason whatever. The ring-shaped auxiliary tread members 30 and 31 are mounted on a base 32 having side arms 33 and 34 engaged by the outer sides of the tread members 30 and 31, the inner sides of which are engaged by segmental plates 35, 36 which form guides for the cup-shaped holders 21 of the main tread sections 20. The transverse bolts 40 extend through the sides 33, 34, the auxiliary tread members 30, 31 and the plates 35, 36 to fasten the several parts constituting the auxiliary tread with each other. On each bolt 40 is mounted a spacing tube 41 abutting at its ends against the plates 35, 36 to hold the latter in position. The bolts 40 extend between adjacent ends of the holders 21 of adjacent main tread sections and on each spacing tube 41 of a bolt 40 is mounted a roller 42 forming a guide for the corresponding ends of the cup-shaped holders 21. The base 32 is arched in cross section to conform to the shape of the plate 23, and the said base is provided with openings 44 for the passage of the lugs 22, as plainly indicated in Figs. 1 and 2.

The auxiliary tread is supported from the wheel center and for this purpose use is made of annular plates 50 and 51 fastened by the bolts 40 to the auxiliary tread and fastened by transverse bolts 52 to the felly 12 of the wheel center, as plainly illustrated in the drawings. The main tread projects normally beyond the auxiliary tread members 30 and 31 and hence when the wheel is in use the main tread 20 is actuated while the auxiliary tread members 30 and 31 are normally inactive. By mounting the main tread 20 on the cushion it is evident that the desired resiliency is given to the wheel. In case of an increase in the load or injury to the cushion the main tread sections move radially toward the center of the wheel until the auxiliary tread members 30 and 31 come in contact with the ground and thus aid or wholly sustain the load of the vehicle.

From the foregoing it will be seen that the auxiliary tread members 30 and 31 permit of using the vehicle until a place is reached where the desired repairs to the cushion can be made. It will further be noticed that the supporting plates 50, 51 for the auxiliary tread form with the latter a complete inclosure for the cushion, that is, the shoe 14 and its inner tube 15, and hence said cushion is not liable to be punctured by nails or other devices. It will also be noticed that the danger of blow-outs is reduced to a minimum.

Instead of providing the wheel with a cushion formed of a shoe 14 and an inner tube 15, use may be made of a cushion formed of springs 60, 61, 62 and 63 interposed between the bottom of the cup-shaped holder 64 of each main tread section 65 and the rim 66 mounted on felly 67 of the wheel center, having the usual spokes 68 and the hub (not shown). The springs 60, 61 and 62 are preferably coil springs while the spring 63 is elliptical fastened by rivets or other fastening means 70 to the bottom of the cup-shaped holder 64. The bottom of each holder 64 is provided with side flanges 71, 72 supporting holders 73, 74 for the auxiliary treads 75, 76 flanking the main tread. The holders 73, 74 for the auxiliary treads 75, 76 are supported by rings 80 and 81 from the felly 67, and for this purpose the rings 80 and 81 are attached by bolts 82 to the auxiliary treads and by bolts 83 to the felly 67. The main tread normally extends beyond the peripheral faces of the auxiliary treads 75, 76 and hence the latter are normally inactive but become active in the same manner as above described relative to the auxiliary treads 30, 31 so that further description of this phase of the invention is not deemed necessary. It will be noticed that by having the flanges 71 and 72 the outward movement of the holders 64 of the main tread section 65 is limited but the said cup-shaped holders 64 are free to slide inward. The sides of the holder 64 are guided by the inner plates 77, 78 of the auxiliary treads 75, 76, and the ends of the cup-shaped holder 64 are guided by the rollers 84 mounted on the bolts 82, the same as above described relative to the rollers 42.

Having thus described my invention, I claim as new and desire to secure by Letters Patent:—

1. In a resilient wheel, a wheel body, a cushion arranged peripherally on the wheel body, a main tread holder having a member loosely resting upon the cushion, a tread in the holder, auxiliary tread holders on opposite sides of the main tread holder and between which the main tread holder is slidable, a tread in each of the auxiliary holders, and means for supporting the auxiliary tread holders from the wheel body.

2. In a resilient wheel, a wheel body, a cushion arranged peripherally on the wheel body, a main tread holder, a curved plate resting loosely on the cushion, members connecting the said plate and tread holder and spacing them apart, auxiliary tread holders on opposite sides of the main tread holder and between which said main tread holder slides the auxiliary tread holders having a common and apertured base resting upon the curved plate of the main tread holder and through the apertures of which the said spacing members extend, and means for supporting the auxiliary tread holders from the wheel body.

3. In a resilient wheel, a wheel body, a cushion arranged peripherally on the wheel body, a plurality of holders resting on the cushion, a main tread formed of sections, one in each of the holders, auxiliary holders on opposite sides of the first named holders, ring shaped auxiliary treads in the auxiliary holders, means for supporting the auxiliary holders from the body of the wheel, and transverse guides extending between the holders of the main tread sections.

4. In a resilient wheel, a wheel body, a cushion mounted peripherally on the wheel body, a plurality of holders resting on the cushion, a main tread formed of sections, one in each holder, auxiliary holders on opposite sides of the first named holders, ring shaped treads in the auxiliary holders, ring-shaped supporting plates secured to the wheel body, and bolts securing the said plates to the auxiliary tread holders, said bolts passing between the ends of the adjacent holders of the main tread sections and connecting the auxiliary holders.

5. In a resilient wheel, a wheel center, a cushion mounted peripherally on the said wheel center, a main tread made in sections, each section resting on the said cushion, an auxiliary tread having an annular base member approximately U shape in cross section, two resilient members mounted on the base member and engaging the sides thereof, rings engaging the inner faces of the said resilient members and forming guides for the main tread to slide on in the plane of the wheel, and bolts extending transversely through the said auxiliary tread intermediate adjacent main tread sections.

6. In a resilient wheel, a wheel center, a cushion mounted peripherally on the said wheel center, a main tread made in sections, each section resting on the said cushion, an auxiliary tread having an annular base member approximately U shape in cross section, two resilient members mounted on the base member and engaging the sides thereof, rings engaging the inner faces of the said resilient members and forming guides for the main tread to slide on in the plane of the wheel, bolts extending transversely through the said auxiliary tread intermediate adjacent main tread sections, spacing means on each bolt and abutting with its ends against the said rings, and a roller on each bolt.

7. In a resilient wheel, a wheel center, a cushion mounted peripherally on the said wheel center, a main tread made in sections, each provided with a cup-shaped holder, a resilient tread member seated in the said holder, lugs on the holder, a plate attached to the lugs and resting on the said cushion, an auxiliary tread having a base made U shape in cross section, resilient ring treads mounted on the said base and engaging the sides of the base, holding plates engaging the inner faces of the ring treads and forming guides for the said cup-shaped holders, bolts extending transversely through the said base sides, ring treads and holding plates, and passing between adjacent main tread sections, and annular supporting plates attached to the wheel center and to the said sides of the base of the auxiliary tread.

HUGH H. SCHRAMM.

Copies of this patent may be obtained for five cents each, by addressing the "Commissioner of Patents, Washington, D. C."